(12) United States Patent
Jones et al.

(10) Patent No.: US 7,277,692 B1
(45) Date of Patent: Oct. 2, 2007

(54) SYSTEM AND METHOD OF COLLECTING AUDIO DATA FOR USE IN ESTABLISHING SURROUND SOUND RECORDING

(75) Inventors: Bryce A. Jones, Overland Park, KS (US); Jason Delker, Olanth, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 814 days.

(21) Appl. No.: 10/192,447

(22) Filed: Jul. 10, 2002

(51) Int. Cl.
*H04M 1/725* (2006.01)

(52) U.S. Cl. .................. 455/412.1; 455/466; 340/574; 381/23; 709/217

(58) Field of Classification Search ............ 455/414.1, 455/414.2, 414.3, 414.4, 456.1–6, 413, 456, 455/466, 412.1; 381/56, 58, 77, 80, 105, 381/1, 23, 310; 84/1, 26, 27, 622; 73/571; 340/574; 709/217; 715/500.1
See application file for complete search history.

(56) References Cited

U.S. PATENT DOCUMENTS

| | | | | |
|---|---|---|---|---|
| 3,827,288 A | * | 8/1974 | Fletcher et al. ................ 73/571 |
| 6,559,769 B2 | * | 5/2003 | Anthony et al. ............ 340/574 |
| 6,760,448 B1 | * | 7/2004 | Gundry ........................ 381/23 |
| 6,804,806 B1 | * | 10/2004 | Bansal et al. ............ 715/500.1 |
| 6,826,407 B1 | * | 11/2004 | Helferich ..................... 455/466 |
| 6,849,794 B1 | * | 2/2005 | Lau et al. ..................... 84/622 |
| 7,035,091 B2 | * | 4/2006 | Le et al. ..................... 361/683 |
| 2002/0035609 A1 | * | 3/2002 | Lessard et al. ............. 709/217 |
| 2002/0137523 A1 | * | 9/2002 | Diggelen .................... 455/456 |
| 2003/0031334 A1 | * | 2/2003 | Layton et al. .............. 381/310 |
| 2003/0092448 A1 | * | 5/2003 | Forstrom et al. ........... 455/456 |
| 2003/0123673 A1 | * | 7/2003 | Kojima .......................... 381/1 |
| 2004/0043757 A1 | * | 3/2004 | Wilson ........................ 455/413 |

* cited by examiner

Primary Examiner—Gerald Gauthier

(57) ABSTRACT

A system and method for collecting audio data for use in establishing an audio recording such as a surround sound recording are described. One exemplary method includes recording audio data at a plurality of mobile terminals located in a plurality of location zones in a given location, sending the recorded audio data from the plurality of mobile terminals to a central network server, and the central network server recording the received audio data into a plurality of audio tracks that may be used in establishing an audio recording.

17 Claims, 6 Drawing Sheets

SYSTEM AND METHOD OF COLLECTING AUDIO DATA FOR USE IN ESTABLISHING SURROUND SOUND RECORDING

BACKGROUND

1. Field of the Invention

The present invention relates to telecommunications systems and, more particularly, to a system and method of collecting audio data for use in establishing audio recordings such as surround sound audio recordings.

2. Description of Related Art

There are many ways to make and present a sound recording. In the simplest recording method, also known as mono, sound is recorded on a single audio track, or channel, which is typically played on a single speaker. Two-channel recordings, in which sound is played on speakers on either side of the listener, are often referred to as stereo. The simplest two-channel recordings are produced with two microphones that are used to capture sound produced by two sound sources such as a musical instrument and a vocalist, for instance.

Professional audio studios use multiple-channel recording systems, which can isolate and process numerous individual sounds. In multi-channel playback systems, i.e., systems having more than two individual audio channels, each sound recorded from an individual channel may be processed separately and played through a corresponding speaker or speakers. Therefore, sounds which are recorded from, or intended to be placed at, multiple locations around a listener, can be realistically reproduced through a dedicated speaker placed at the appropriate location.

A conventional surround sound system provides five directional channels including a center channel, a right front channel, a left front channel, a right rear channel, and a left rear channel. Other systems, such as a Dolby AC-3 surround system, provide six separate audio signals. In the Dolby AC-3 multi-channel system, two audio channels are intended for playback on forward left and right speakers, two channels are reproduced on rear left and right speakers, one channel is used as a forward center dialogue speaker, and one channel is used for low-frequency and effects signals. With the growing popularity of the surround sound systems, future systems may use more than six channels to enhance listeners' experience.

SUMMARY

The present invention provides a method and system for collecting audio data for use in establishing an audio recording such as a surround sound recording.

One exemplary method includes recording audio data at a plurality of mobile terminals located in a plurality of location zones in a given location, sending the recorded audio data from the plurality of mobile terminals to a central network server, and the central network server recording the received audio data on a plurality of audio tracks for use in establishing a surround sound recording. The method further includes receiving the audio data from the plurality of mobile terminals at the central network server, determining a location zone of a mobile terminal from which the audio data was received, and using the location zone information as a basis to place the audio data into the plurality of audio tracks.

One exemplary system for creating surround sound recording includes a central network server and a mobile client terminal. In the exemplary system, the mobile client terminal located in a given location records audio data from an audio source and sends the recorded audio data to the central network server. When the central network server receives the audio data, the central network server records the audio data into one of a plurality of audio tracks that are used in establishing an audio recording. In one exemplary embodiment, the central network server is configured to determine a location of the mobile client terminal relative to the audio source as a basis to determine the audio track to which the audio data is placed.

These as well as other aspects and advantages of the present invention will become apparent to those of ordinary skill in the art by reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

Figure 1:
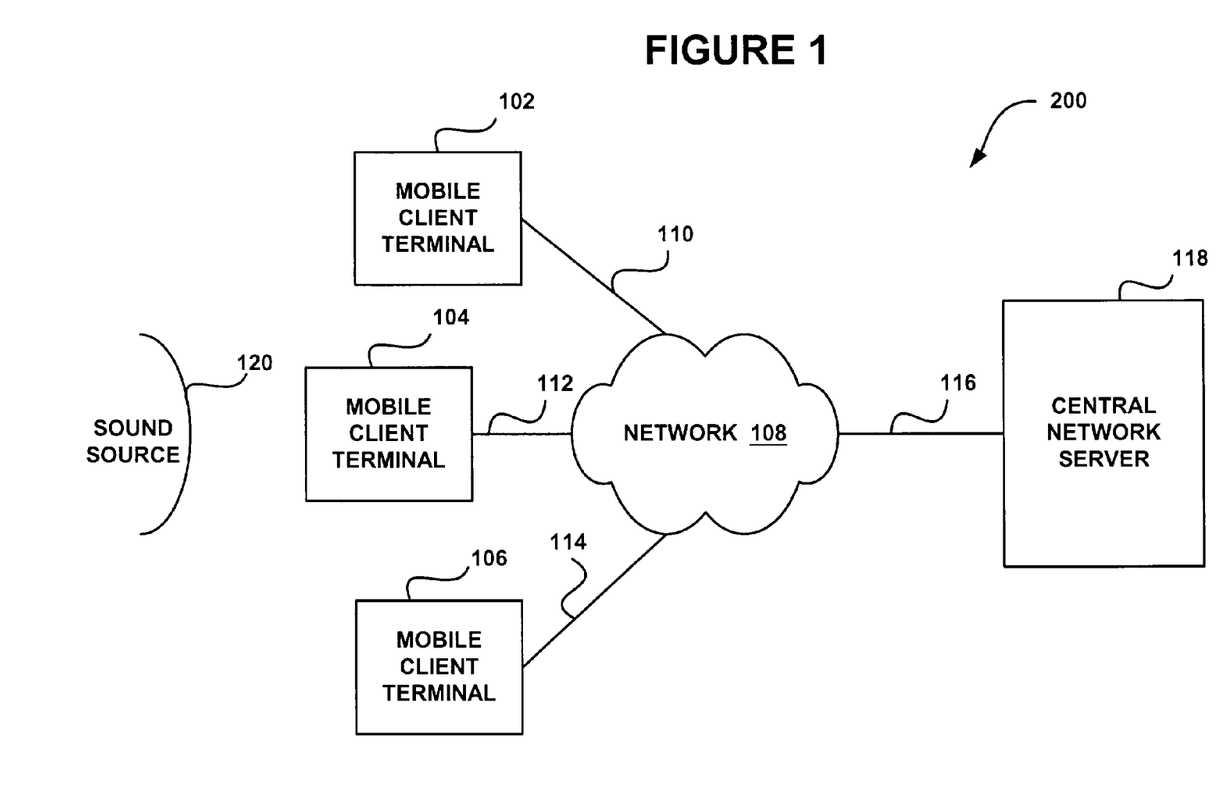
FIG. 1 is a block diagram of a network arranged in accordance with the exemplary embodiments for collecting audio data for use in establishing surround sound recordings.

FIG. 1 is a block diagram providing a general representation of a telecommunications network 100 in which exemplary embodiments of the present invention for collecting audio data for use in establishing a sound recording, such as a surround sound recording, can be used. It should be understood that this and other arrangements and processes described herein are set forth for purposes of example only, and other arrangements and elements (e.g., machines, interfaces, orders of elements, etc.) can be used instead and some elements may be omitted altogether. Further, as in most telecommunications applications, those skilled in the art will appreciate that many of the elements described herein are functional entities that may be implemented as discrete components or in conjunction with other components, in any suitable combination or location.

As shown in FIG. 1, network 100 includes a sound source 120, a plurality of mobile client terminals 102, 104, 106, a network 108, and a central network server 118. Sound source 120 may take any suitable form, such as one or more musical instruments, for instance. Plurality of mobile client terminals 102, 104, and 106 collect audio data produced by sound source 120.

Sound source 120 and mobile client terminals 102, 104, and 106 are located in a designated location. The designated location may take any of a variety of forms. As an example, and without limitation, the designated location could be a stadium, a theater, a conference room, a church, or a combination of these or other areas. Further, according to an exemplary embodiment, a given location may be further subdivided into location zones, and mobile client terminals 102, 104, and 106 may be located in one or more of the location zones. Each location zone could be defined in various ways. For example, a zone could be a particular area in a given location, and could be defined as a polygon defined by a radiation pattern from an antenna located on a network entity such as an access point that will be described in greater detail below.

Mobile client terminals 102, 104, and 106 may take any suitable form of personal, portable and handheld devices such as mobile or cellular telephones, personal digital assistants, notebook computers, or any other audio-recording-capable mobile client devices. However, it should be understood that the exemplary embodiments are not limited to these types of mobile client terminals, and different or equivalent mobile client terminals could also be used. According to an exemplary embodiment, mobile client terminals 102, 104, and 106 may be third-generation ("3G") (or later) devices supporting packet-based transmission of digitalized voice, audio, data, and video. Further, mobile client terminals 102, 104, and 106 may be Wireless LAN ("WLAN") capable mobile client terminals supporting Global System for Mobile Communications, ("GSM"), Personal Communications Services ("PCS") including Code Division Multiple Access ("CDMA"), Bluetooth, 802.11a, Wireless LAN, 802.11b, or other types of wireless network interfaces. However, it should be understood that mobile client terminals could also support any other existing or later developed protocols.

As illustrated in FIG. 1, mobile client terminals 102, 104, and 106 communicate with central network server 118 via communication links 110, 112, and 114, respectively, network 108, and a communication link 116. Communication links 110, 112, 114, and 116 may include wireless communication links, for instance. Network 108 may be a WLAN; however, different types of networks could also be used.

Central network server 118 may be connected to network 108 via one or more other networks including a wired network, a wireless network, or a combination thereof. Alternatively, central network server 118 may be connected to network 108 via other means such as a direct Bluetooth wireless link, for instance. Central network server 118 may collect audio data received from mobile client terminals 102, 104, and 106, and the collected audio data may be later used in establishing a sound recording such as a single or multi-channel recording. In one embodiment, central network server 118 may include a digital audio workstation ("DAW") equipped with a sound card and programming for editing and processing audio data. For example, central network server 118 may include a two-channel or multi-channel editor capable of producing a surround sound recording.

It should be understood that, in an alternative embodiment, central network server 118 may store audio data received from mobile client terminals 102, 104, and 106, and an external network entity that is equipped with a sound card and an editing program may access the audio data at central network server 118 and may use the collected data to establish a sound recording.

According to one exemplary embodiment, mobile client terminals 102, 104, and 106 may be located in a number of location zones in a given location and may collect audio data from sound source 120. Mobile client terminals 102, 104, and 106 may then send the collected audio data to central network server 118 via network 108. When central network server 118 receives the audio data, network server 118 collects the received audio data that may be used in establishing a surround sound recording. An exemplary embodiment, for establishing a surround sound or multi-channel recording will be described in greater detail in reference to subsequent figures.

Figure 2:
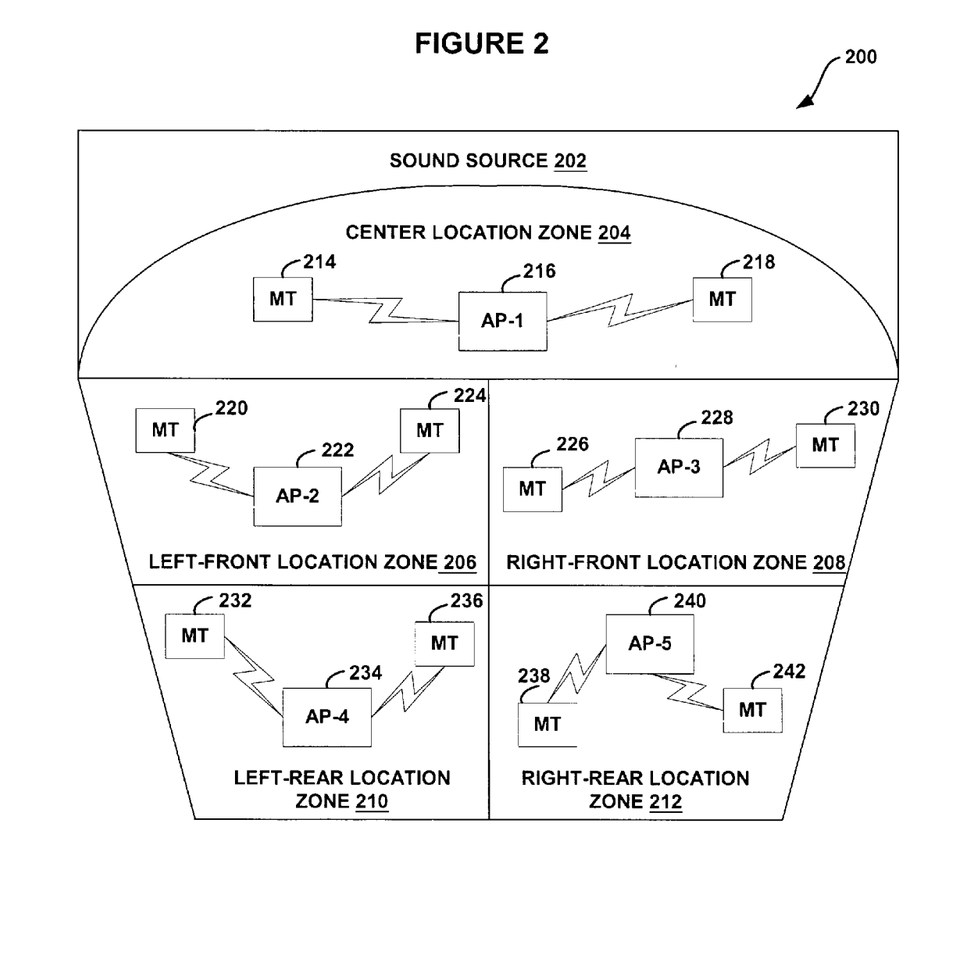
FIG. 2 is a more detailed block diagram of a network arranged in accordance with the exemplary embodiments for collecting audio data for use in establishing surround sound recordings.

FIG. 2 is a more detailed block diagram illustrating an exemplary network 200 that may be used for recording audio data in a given location. According to an exemplary embodiment illustrated in FIG. 2, a sound recording location includes a sound source 202, and is divided into a plurality of location zones including a center location zone 204, a left-front location zone 206, a right-front location zone 208, a left-rear location zone 210, and a right-rear location zone 212. It should be understood that the embodiment illustrated in FIG. 2 is only exemplary, and more or fewer location zones could also be used.

Further, as illustrated in FIG. 2, each location zone may be established using an access point ("AP"), which may bridge communications between mobile client terminals ("MTs") and a central network server such as central network server 118, illustrated in FIG. 1. Specifically, center location zone 204 includes a first AP 216 ("AP-1") and two MTs 214 and 218, left-front location zone 206 includes a second AP 222 ("AP-2") and two MTs 220 and 224, right-front location zone 208 includes a third AP 228 ("AP-3") and two MTs 226 and 230, left-rear location zone 210 includes a fourth AP 234 ("AP-4") and two MTs 232 and 236, right-rear location zone 212 includes a fifth AP 240 ("AP-5") and two MTs 238 and 242. It should be understood that each location zone is not limited to including two MTs, and more or fewer MTs could also be located in each location zone. Further, it should be understood that a location zone is not limited to being defined using a single access point, and a location zone could also be defined using more than one access point.

Each access point may consist of a radio network interface (e.g., a wireless Ethernet network interface) and bridging software conforming to the 802.11b bridging standard, for instance. Further, each access point may act as a base station for a wireless network and may provide access for multiple mobile client terminals onto other networks, such as network 108 illustrated in FIG. 1.

A mobile client terminal may access or become associated with a location zone by receiving synchronization information from an access point that defines that location zone. In one embodiment, a mobile client terminal may do that using a passive scanning method or an active scanning method. Using the passive scanning method, a mobile client terminal may locate an access point by receiving from the access point a beacon frame, i.e., a frame that is sent out periodically from an access point and contains synchronization information. Alternatively, using the active scanning method, a mobile client terminal may locate an access point by transmitting probe request frames and receiving one or more probe response frames from one or more access points located in a given location.

Once a mobile client terminal locates an access point, the mobile client terminal may be authenticated. During the authentication process, the mobile client terminal and the access point may interchange password information. Once a mobile client terminal is authenticated, the mobile client terminal may initiate an association process with the access point, which consists of exchanging information about the mobile client terminal and the access point. Once the association process is completed, the mobile client terminal may start transmitting and receiving data frames via the access point. Specifically, according to the exemplary embodiments, the mobile client terminal may start transmitting audio data to a central network server.

According to an exemplary embodiment, each mobile terminal illustrated in FIG. 2 may first collect audio data from sound source 202 and then may send the collected audio data via its respective access point for receipt at a central network server, such as central network server 118 illustrated in FIG. 1. For instance, MT 220 and MT 224, illustrated in FIG. 2, may send audio data via AP-2 222, and MT 232 and MT 236 may send audio data via AP-4 234.

According to an exemplary embodiment, when a mobile client terminal enters a location zone and becomes associated with an access point that defines the location zone, the mobile client terminal may receive a network address of the central network server arranged to receive audio data from a plurality of location zones in that location. In such an embodiment, the mobile client terminal may send audio data to the network address of the central network server. The mobile client terminal may receive the network address of the central network server using one of several methods. According to one method, a user of the mobile client terminal may access a predetermined web site that may specify the network address of a central network server, and the user may manually configure the mobile client terminal with the network address of the central network server. According to an alternative method, the user may access a predetermined web site that may contain an application, such as Java or Java 2 Mobile Edition ("J2ME") application, that may automatically connect the mobile client terminal with the central network server so that the user can participate in the audio recording.

Alternatively, the mobile terminal may have no knowledge of a network address of a central network server, and, instead, may only have knowledge of a network address of the access point. In such an embodiment, the access points in a given location may be pre-programmed with a network address of a central network server, and, when the access point receives audio data from a mobile client terminal located in a location zone being served by the access point, the access point may forward the audio data to the network address of the central network server.

Further, when a mobile client terminal locates an access point, the mobile client terminal may provide to the access point a predetermined identifier classifying a user of the mobile client terminal as a user willing to participate in establishing a surround sound recording. For instance, the predetermined identifier may be provided from the mobile client terminal based on a user input. In such an embodiment, when a user enters a location zone involved in the surround sound recording, a user may receive a message asking the user if the user wishes to participate in the surround sound recording. In one embodiment, the central network server may send the query message. Alternatively, an access point may be configured to send query messages to mobile client terminals in a location zone defined by the access point. If the user wishes to participate in the surround sound recording, the user may then use an access point that serves a location zone in which the mobile client terminal is located.

According to one embodiment, when the user of the mobile client terminal enters a location zone being served by an access point, the user may launch an HTTP (web) browser such as Internet Explorer or Netscape, for instance. When the user activates the HTTP browser, the access point may capture all HTTP traffic originating from the mobile client terminal and may redirect it to the central network server. The central network server may then provide configuration information to the user of the mobile client terminal. The user may then manually enter configuration information into the mobile terminal, and the configuration information may be sent to the central network server. In one embodiment, the configuration information may include a message asking if the user wishes to participate in the recording, for instance. Alternatively, the central network server may provide to the mobile terminal a Java or J2ME web application embedded into an event's (such as a predetermined concert's recoding) web site page on the central network server.

Figure 3:
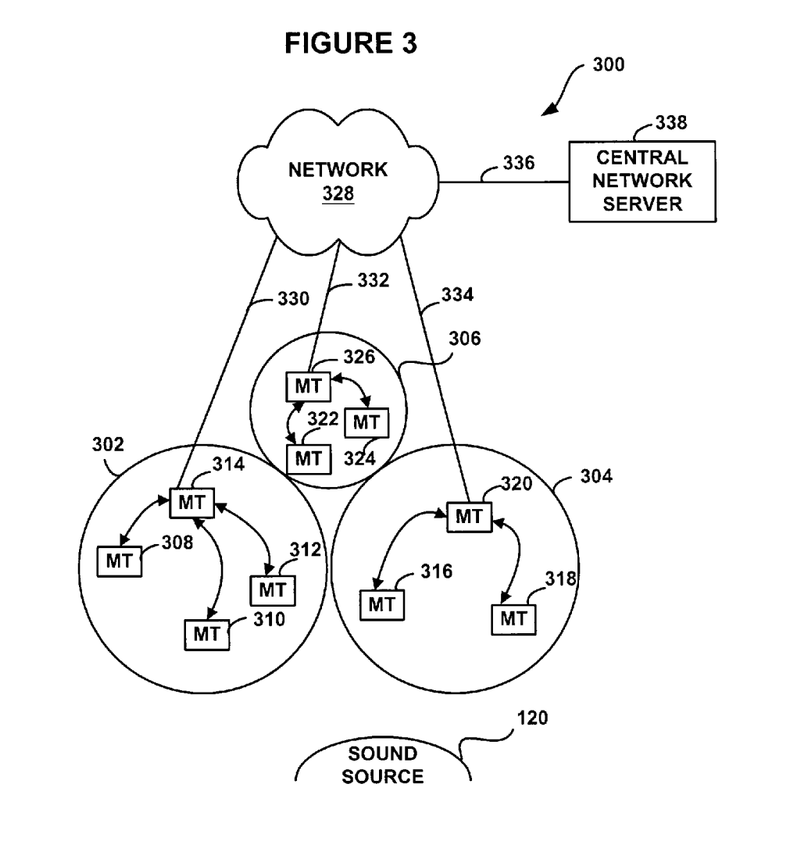
FIG. 3 is another more detailed block diagram of a network arranged in accordance with the exemplary embodiments for collecting audio data for use in establishing surround sound recordings.

As mentioned in reference to FIG. 1, client mobile terminals are not limited to using 802.11 standards, and the client mobile terminals may also support the Bluetooth network interface. FIG. 3 illustrates a network architecture 300 that may be used for collecting audio data using Bluetooth capable mobile client terminals. A sound recording location includes a sound source 340 and three location zones 302, 304, and 306. It should be understood that FIG. 3 illustrates only an exemplary embodiment, and more than three location zones could also be used. Each location zone includes a plurality of mobile client terminals that can communicate with each other. Specifically, location zone 302 includes MTs 308, 310, 312, and 314, location zone 304 includes MTs 316, 318, and 320, and location zone 306 includes MTs 322, 324, and 326.

According to an exemplary embodiment, each location zone contains at least one mobile client terminal that is identified as a master of the location zone, and at least one mobile client terminal that is identified as a slave, with which the master may communicate. It should be understood that a mobile client terminal may function as a master or slave mobile client terminal, and its functionality may change over time. According to an exemplary embodiment, a mobile client terminal may be assigned a function of a master mobile client terminal based on a number of criteria including a remaining battery life, or available memory, for instance. Alternatively, an event sponsor may pre-configure a mobile client terminal to serve as a master client terminal. Further, alternatively, when a mobile client terminal accesses a central network server, the central network server may configure the mobile client terminal as a master mobile client terminal.

For instance, as illustrated in FIG. 3, location zone 302 includes a master MT 314 and three slave MTs 308, 310, and 312, location zone 304 includes a master MT 320 and two slave MTs 316 and 318, and location zone 306 includes a master MT 326 and two slave MTs 322 and 324.

Each master MT is then connected to a network 328 such as a LAN or WLAN, for instance. Specifically, MTs 314, 320, and 326 are connected to the network 328 via communication links 330, 332, and 334, respectively. Communication links 330, 332, and 334 may be wireless communication links, for instance. Network 300 further includes a central network server 338 connected to network 328 via a communication link 336. It should be understood that communication link 336 may include a wireless communication link, a wired communication link, or a combination thereof. In another embodiment, central network server 338 may be located on network 328.

According to the Bluetooth specification, each mobile client terminal may be identified using a unique IEEE-type 48-bit address, often referred to as a Bluetooth device address ("BD_ADDR"), and may use a free-running 28-bit clock. Bluetooth mobile client terminals can communicate with each other by acquiring each other's Bluetooth addresses and clocks.

In one embodiment, to identify each slave, a master mobile client terminal may assign a locally unique active member address to slaves in a location zone that is served by the master mobile client terminal. To engage in communications in a location zone, slave mobile client terminals receive the BD_ADDR of the master mobile client terminal and the Bluetooth clock of the master mobile client terminal. According to the Bluetooth standard, this information may be acquired in two phases: an inquiry phase that is used for locating terminals, and a paging phase that is used for inviting terminals to join a location zone.

An inquiry process is a terminal discovery process during which a master terminal of a future location zone discovers other terminals in its vicinity. The master terminal may transmit inquiry messages to make its presence known to other terminals. Mobile client terminals that perform inquiry scans, i.e., actively search for inquiry messages, may respond with inquiry response messages that, among other parameters, include a BD_ADDR of the master terminal. Then, the master mobile client terminal may page mobile client terminals that have responded to the inquiry messages to join a location zone being served by the master mobile terminal. Using the information sent by the paging terminal, the paged terminal may join a location zone whose master is the paging terminal. After joining the location zone, the master and slave terminals may negotiate reversal roles, in which case the original master becomes a slave in the location zone whose master will be the original slave, for instance.

Referring back to FIG. 3, each slave mobile client terminal may send recorded audio data via a master mobile client terminal serving the location zone of the slave mobile client terminal. For instance, mobile client terminal 308 located in location zone 302 may first collect audio data from audio source 120 and then send the collected audio data to central network server 328 via master mobile client terminal 314. When central network server 328 receives the audio data, central network server 328 may first determine a position of mobile client terminal 308 relative to audio source 120. According to an exemplary embodiment, central network server 328 may determine the position of mobile client terminal 308 based on which master mobile client terminal was used to send the audio data from mobile client terminal 308. When central network server 328 receives the audio data, and based on the determined position, central network server 328 may record the audio data in a predetermined audio track of a plurality of audio tracks that may be used in establishing an audio recording.

Additionally, it should be understood that exemplary embodiments are not limited to using an access point to define a location zone. In an alternative embodiment, location and positioning technologies, such as Global Positioning System ("GPS"), could also be used to determine locations of MTs that provide audio data to a central network server. In such an embodiment, a network server may include a table defining one or more location zones in a given location. For instance, each location zone in a given location may be defined as a polygon comprised of nodes having specific geographic coordinates (latitude/longitude coordinates). In such an embodiment, when the central network server receives audio data from a mobile client terminal, the central network server may determine coordinates of the mobile terminal and use the coordinates to determine a location zone in which the mobile client terminal is located.

Figure 4:
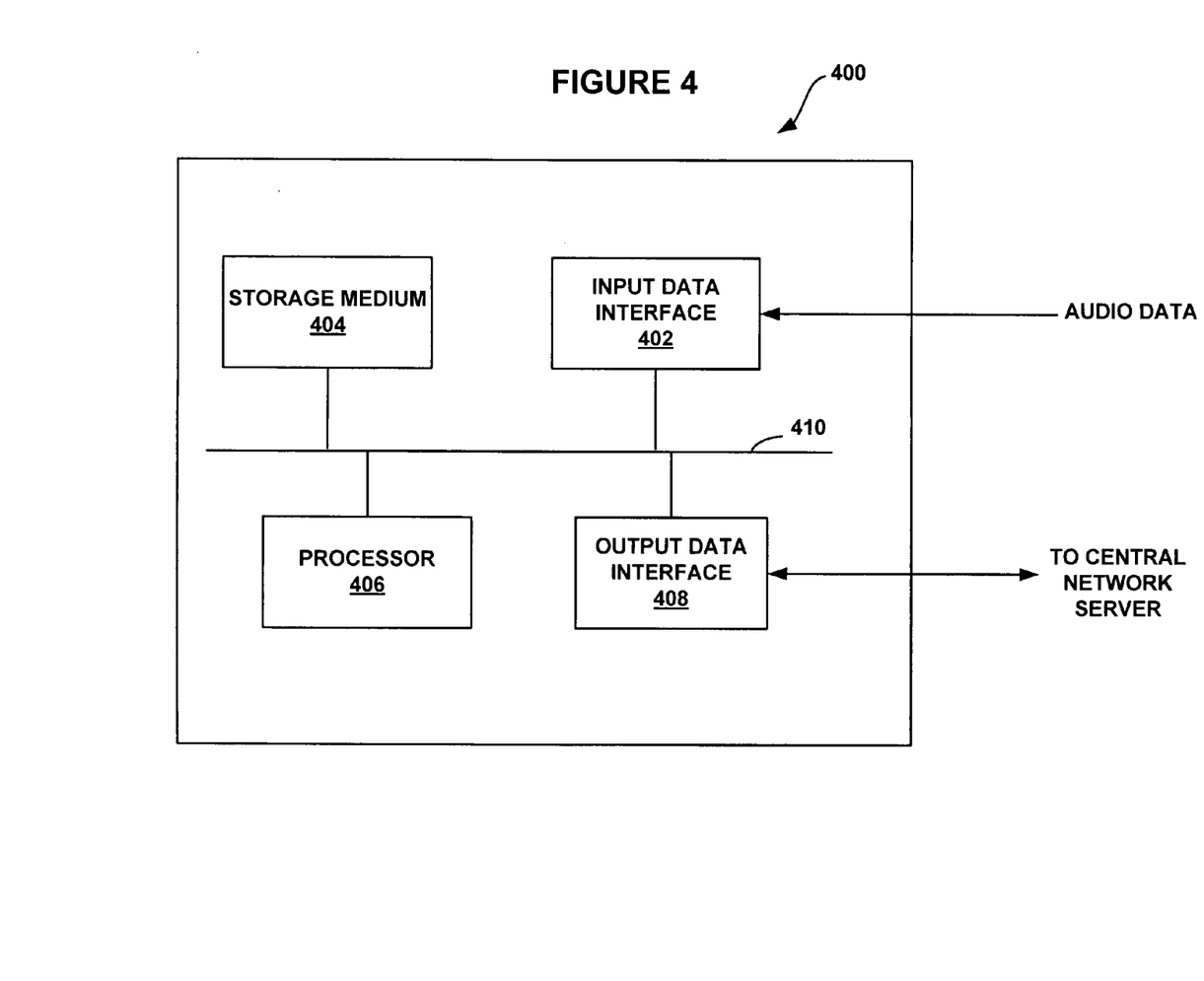
FIG. 4 is a block diagram of a client device that may be used in the exemplary embodiments.

FIG. 4 is a simplified block diagram of a mobile client terminal 400 that may be used in the exemplary embodiments for collecting audio data for use in establishing sound recordings, such as surround sound recordings. As shown in FIG. 4, mobile client terminal 400 includes an input data interface 402, a storage medium 404, a processor 406, an output data interface 408, all of which may be coupled together via a system bus 410.

Input data interface 402 may include components to facilitate collecting audio data on mobile client terminal 400. Input data interface 402 may include a microphone for collecting audio data from one or more audio sources located in a given location.

Processor 406 may be a microprocessor arranged to execute program instructions and may embody hardware and firmware based logic. For instance, processor 406 may execute instructions for communicating with an access point, or for sending collected audio data to a central network server via the access point.

Storage medium 404 may be an optical, magnetic and/or other storage such as ROM, RAM, a disk drive or the like, and may hold program instructions and other data for execution and use by processor 406. In the exemplary embodiment, the storage medium 404 may include audio data collected at the mobile client terminal.

Output data interface 408 may include components to facilitate sending audio data collected at mobile client terminal 400 to a central network server, such as central network server 118 illustrated in FIG. 1.

Figure 5:
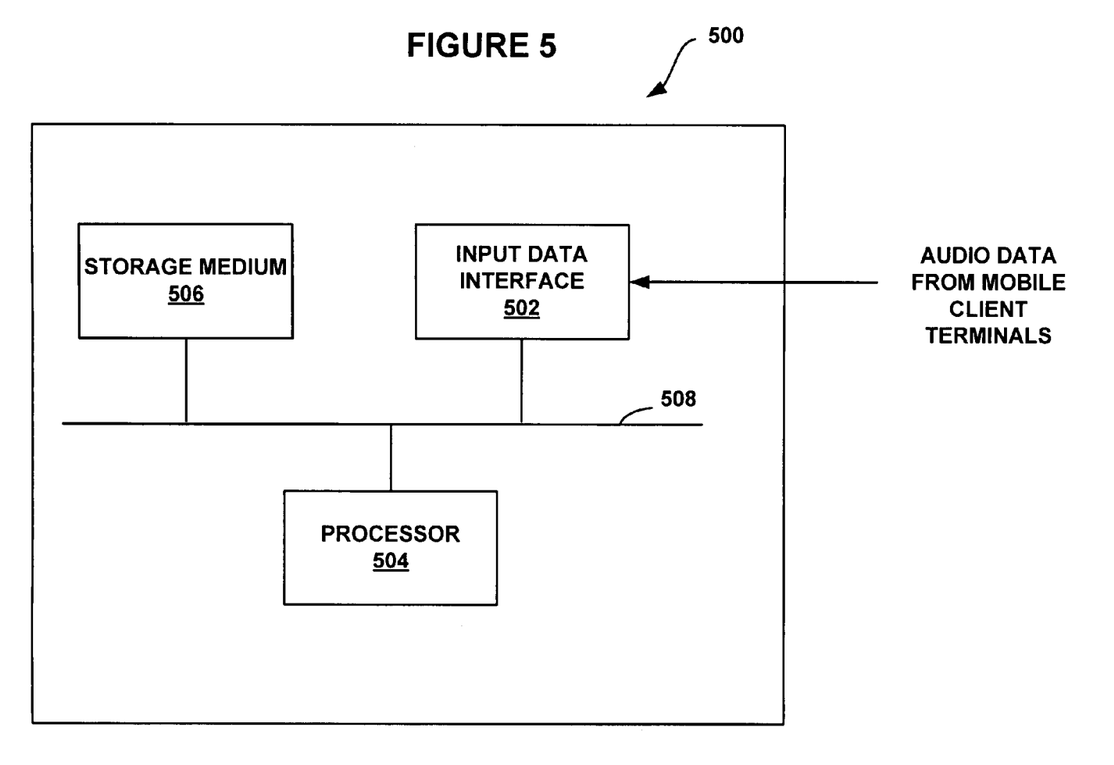
FIG. 5 is a block diagram of a central network server that may be used in the exemplary embodiments.

FIG. 5 is a simplified block diagram of a central network server 500 that may be employed in the exemplary embodiments for collecting audio data for use in establishing sound recordings. As shown in FIG. 5, central network server 500 includes an input data interface 502, a processor 504, a storage medium 506, all of which may be coupled together via a system bus 508.

Input data interface 502 may include components to facilitate receiving audio data collected at mobile client terminals. Storage medium 506 may hold program instructions for execution and use by processor 504. In one exemplary embodiment, storage medium 506 may include a sound card and program instructions for processing and editing audio data that is received from mobile client terminals.

Further, storage medium 506 may include a table that maps each access point to a predetermined location zone in a given location. In such an embodiment, a table may map an IP address or an identifier of an access point to a predetermined location zone identifier so that when central network server 500 receives audio data from a mobile client terminal via an access point, central network server 500 may determine a location zone of the mobile client terminal in the predetermined location based on an IP address or an identifier of an access point that was used to send the audio data to central network server 500.

According to one exemplary embodiment, storage medium 506 may include an analog multi-track recorder tape that encodes and decodes audio information on discrete linear segments (i.e, tracks) of tape. In one embodiment, each track may correspond to a single channel, and audio data received from a mobile client terminal may be recorded on a predetermined track based on a location zone in which the mobile client terminal is located. According to an exemplary embodiment, audio data stored on one or more audio channels may be later mixed to create a sound recording, such as a surround sound recording.

Alternatively, storage medium 506 may include one or more digital tape decks, such as digital audio tapes ("DATs") or modular digital multitracks ("MDMs"), for storing audio data received from mobile client terminals. Unlike analog recorders, digital decks store audio data as a stream of zeroes and ones. In one embodiment, audio data corresponding to multiple location zones (or tracks) may be stored in a format consisting of interleaved frames. In such an embodiment, if three audio tracks are recorded, audio data corresponding to a first audio track may be recorded in a first frame, a fourth frame, a seventh frame, etc., audio data corresponding to a second audio track may be recorded in a second frame, a fifth frame, an eighth frame, etc., and audio data corresponding to a third audio track may be recorded in a third frame, a sixth frame, and a ninth frame, etc. Then, audio data recorded in the tracks may be mixed into one or more audio channels to create a sound recording or a surround sound recording.

In an embodiment in which a digital recording is used, audio data that is sent from a number of mobile client terminals may be recorded on a number of tracks. Further, as mentioned in reference to the preceding figures, a number of mobile client terminals may be located in one location zone. In such an embodiment, the central network server 500 may receive audio data from more than one mobile client terminal located in the location zone. To improve the quality and accuracy of the recorded information from the location zone, the central network server 500 may average audio data received from multiple mobile client terminals at a predetermined time.

Table 1 shows an exemplary set of audio data that may be recorded at eight mobile client terminals in a location zone. The central network server 500 may compare audio data recorded by each mobile client terminal in a location zone against audio data of other mobile client terminals that recorded audio data at a predetermined time. The central network server may then take an average value of all audio data to represent the recorded value of the zone at a particular time. In such an embodiment, each zone can be represented by a recorded track of audio including averaged values of audio data provided by more than one mobile client terminal.

In Table 1, the top row shows an elapse in time, and the last row shows the average (sampled) value at a predetermined period of time for the zone.

TABLE 1

| Time | T | t + 1 | t + 2 | t + 3 | t + 4 | t + 5 | t + 6 | t + 7 |
|---|---|---|---|---|---|---|---|---|
| Mobile1 | 1 | 1 | 0 | 1 | 0 | 0 | 0 | 1 |
| Mobile2 | 1 | 1 | 0 | 0 | 0 | 0 | 0 | 1 |
| Mobile3 | 1 | 1 | — | — | — | — | — | — |
| Mobile4 | 1 | 1 | 0 | 1 | 0 | 1 | 0 | 0 |
| Mobile5 | 1 | 0 | 0 | 1 | 0 | 0 | 1 | 1 |
| Mobile6 | 1 | 0 | 0 | 1 | — | — | — | 1 |
| Mobile7 | 0 | 1 | 0 | 1 | 0 | 0 | 0 | 1 |
| Mobile8 | 1 | 1 | 0 | 1 | 0 | 0 | 0 | 1 |
| $Zone_{AVG}$ | 1 | 1 | 0 | 1 | 0 | 0 | 0 | 1 |

Figure 6:
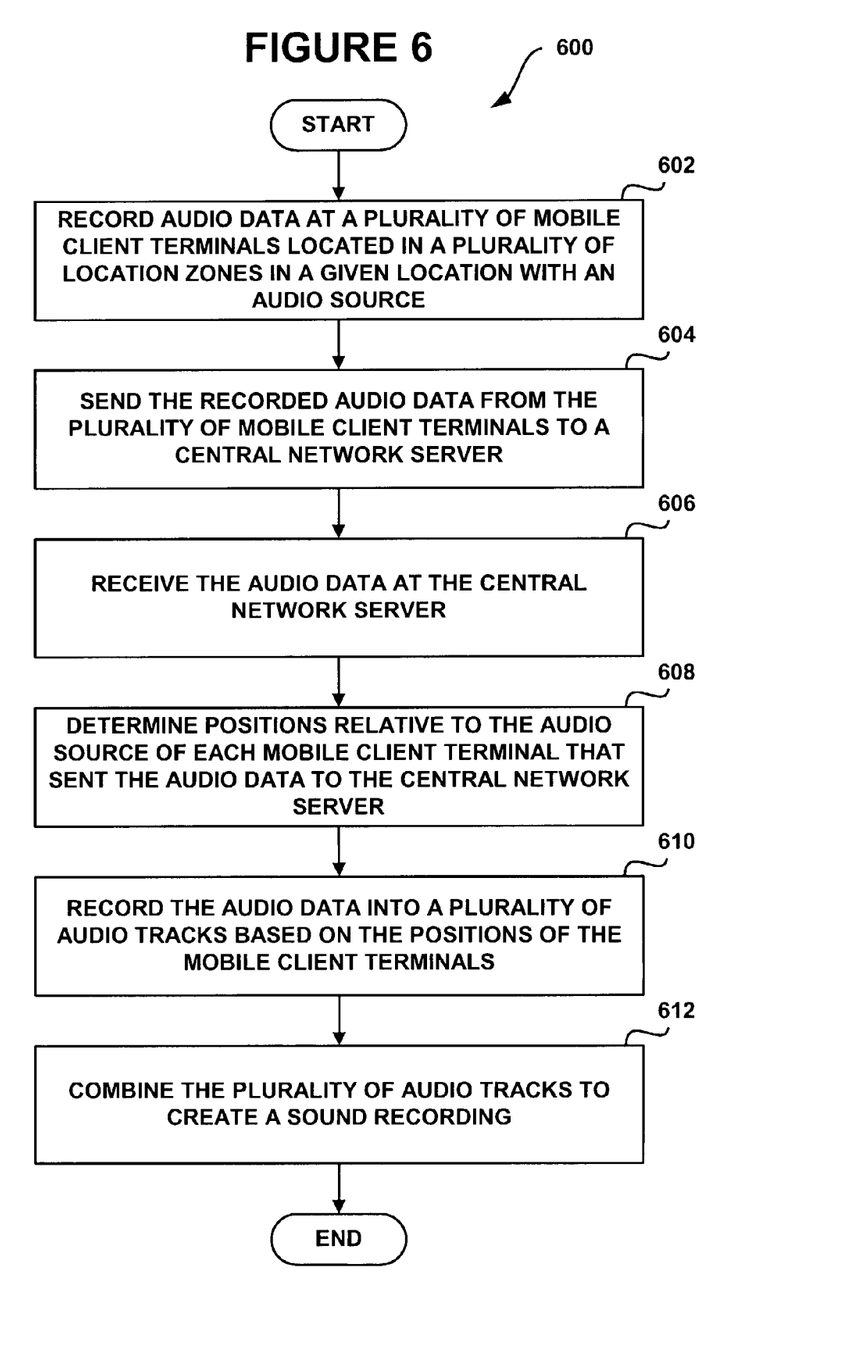
FIG. 6 is a flow chart depicting a set of functions that can be employed in the networks shown in FIGS. 1, 2, and 3 in accordance with the exemplary embodiments for collecting audio data for use in establishing surround sound recordings.

FIG. 6 is a flow chart illustrating a method 600 for collecting audio data for use in establishing a surround sound recording according to one exemplary embodiment.

As shown in FIG. 6, at step 602, a plurality of mobile client terminals record audio data from an audio source located in a given location. According to an exemplary embodiment, the given location is divided into a plurality of location zones that are defined using a plurality of access points, and the plurality of mobile client terminals are located in the plurality of location zones. At step 604, the plurality of mobile client terminals send the recorded audio data to a central network server. In the embodiment using access points that define the plurality of location zones, each mobile client terminal may send the recorded audio data via its respective access point, i.e., an access point that serves the location zone in which the mobile client terminal is located.

At step 606, the central network server receives the audio data from the plurality of mobile client terminals. At step 608, the central network server determines positions relative to the audio source in the given location, of each mobile client terminal that sent the audio data to the central network server. In one embodiment, the central network server may determine positions of the mobile client terminals based on access points that were used to send the audio data from each mobile client terminal. For instance, each access point in the given location could be associated with a predetermined service set identifier ("SSID"), or a MAC address, for instance. It should be understood that each access point may first register with the central network server before any audio data is sent from the access point to the central network server. In such an embodiment, instead of using a device-specific identifier such as a MAC address, for instance, secure logon information could also be used to identify an access point.

At step 610, the central network server records the received audio data into a plurality of audio tracks. According to an exemplary embodiment, the central network server may record the audio data into the plurality of audio tracks based on positions of mobile client terminals relative to the audio source in the given location.

At step 612, the plurality of audio tracks are combined to create a sound recording such as a multi-channel surround sound recording. In one embodiment, the surround sound recording may be produced using any existing or later developed surround sound recording devices, such as Roland's VE-7000, for instance.

It will be apparent to those of ordinary skill in the art that methods involved in the system and methods for audio recordings may be embodied in one or more computer program products that include one or more computer readable media. For example, a computer readable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

Exemplary embodiments of the present invention have been described above. Those skilled in the art will understand, however, that changes and modifications may be made to this embodiment without departing from the true scope and spirit of the present invention, which is defined by the claims.

We claim:

1. A method for collecting audio data, the method comprising:

providing a plurality of access points to define a plurality of location zones in a given location;

recording audio data at a plurality of wireless mobile client terminals located in the plurality of location zones, wherein each wireless mobile client terminal is associated with one of the plurality of access points;

sending the recorded audio data from the plurality of wireless mobile client terminals to a central network server via the plurality of access points; and at the central network server recording the received audio data on a plurality of audio tracks by determining a location zone of each wireless mobile client terminal associated with the audio data received at the central network server and using the location zone as a basis to record the audio data in the plurality of audio tracks.

2. The method of claim 1, further comprising:

combining the plurality of audio tracks to create a multi-channel recording.

3. The method of claim 1, further comprising:

determining that the audio data received at the central network server was sent from more than one wireless mobile client terminal that was located in the same location zone at a particular time; and averaging the audio data received from the more than one wireless mobile client terminal that was located in the same location zone at the particular time before recording the audio data into an audio track of the location zone.

4. The method of claim 1, wherein determining a location zone of each wireless mobile client terminal associated with the audio data received at the central network server comprises:

for each wireless mobile client terminal, determining an access point through which the audio data was received at the central network server; and the central network server using the access point as a basis to determine an audio track of the plurality of audio tracks in which to record the audio data.

5. The method of claim 1, wherein each of the plurality of wireless mobile client terminals is selected from a group consisting of (i) a mobile telephone, and (ii) a personal digital assistant.

6. A method for collecting audio data, the method comprising:

providing a plurality of access points to define a plurality of location zones in a given location with an audio source;

disposing a plurality of mobile client terminals in the plurality of location zones, wherein each wireless mobile client terminal is associated with one of the plurality of access points;

recording audio data from the audio source at each of the mobile client terminals;

sending the recorded audio data from each of the mobile client terminals to a central network server via one of the plurality of access points;

the central network server determining a position of each of the mobile client terminals relative to the audio source; and for each of the mobile client terminals, the central network server placing the recorded audio data from that mobile client terminal into a predetermined audio track of a plurality of audio tracks based on the position of that mobile client terminal.

7. The method of claim 6, further comprising:

the central network server determining an access point through which the audio data was sent to the central network server from each mobile client terminal; and the central network server using the access point as a basis to determine the position of each mobile client terminal relative to the audio source.

8. The method of claim 6, further comprising:

using the plurality of audio tracks to establish an audio recording.

9. The method of claim 8, wherein the audio recording comprises a multi-channel recording.

10. The method of claim 6, wherein the mobile client terminal is selected from a group consisting of (i) a mobile telephone, and (ii) a personal digital assistant.

11. A method for collecting audio data, the method comprising:

receiving audio data at a central network server from a first mobile client terminal via an access point, wherein the first mobile client terminal collected the audio data from an audio source located in a given location;

the central network server determining a position of the first mobile client terminal relative to the audio source based on the access point that was used to send the audio data from the first mobile client terminal; and the central network server using the position of the first mobile client terminal as a basis to record the audio data into a first audio track of a plurality of audio tracks.

12. The method of claim 11, wherein the given location comprises a plurality of location zones, and the first mobile client terminal is located in a first location zone, and the method further comprises:

at the central network server receiving audio data from a second mobile client terminal;

determining a position of the second mobile client terminal relative to the audio source, wherein the second mobile client terminal is located in a second location zone; and the central network server using the position of the second mobile client terminal as a basis to record the audio data into a second audio track of the plurality of audio tracks.

13. The method of claim 11, further comprising:

using the plurality of audio tracks in establishing an audio recording.

14. The method of claim 11, wherein the first mobile client terminal is selected from a group consisting of (i) a mobile telephone, and (ii) a personal digital assistant.

15. A system for collecting audio data for use in establishing audio recordings, the system comprising:

a plurality of access points in a given location comprising an audio source;

a central network server; and a mobile client terminal located in the given location, wherein the mobile client terminal is configured to record audio data from the audio source and send the recorded audio source to the central network server via one of the access points, and the central network server is configured to determine a location of the mobile client terminal relative to the audio source based on the access point that was used to send the audio data and to record the audio data into one of a plurality of audio tracks based on the location.

16. The system of claim 15, wherein the mobile client terminal is selected from a group consisting of (i) a mobile telephone, and (ii) a personal digital assistant.

17. The system of claim 15, further comprising:

a plurality of mobile client terminals located in the given location, wherein the plurality of mobile client terminals is configured to record audio data from the audio source and send the recorded audio data to the central network server.

* * * * *